United States Patent [19]

Bonko et al.

[11] Patent Number: 5,010,935
[45] Date of Patent: Apr. 30, 1991

[54] AGRICULTURAL TIRE AND TREAD LUG THEREFOR

[75] Inventors: Mark L. Bonko, Hartville; Loran C. Lopp, Jr., Wadsworth, both of Ohio

[73] Assignee: The Goodyear Tire & Rubber Company, Akron, Ohio

[21] Appl. No.: 419,878

[22] Filed: Oct. 11, 1989

[51] Int. Cl.$^5$ .............................................. B60C 11/03
[52] U.S. Cl. ............................. 152/209 B; 152/209 R
[58] Field of Search ......................... 152/209 R, 209 B

[56] References Cited

U.S. PATENT DOCUMENTS

| | | | |
|---|---|---|---|
| 2,611,411 | 9/1952 | Rawls | 152/209 B |
| 3,844,326 | 10/1974 | Verdier | 152/209 B |
| 4,186,788 | 2/1980 | Pommier | 152/209 B |
| 4,289,183 | 9/1981 | Abe et al. | 152/209 B |
| 4,446,901 | 5/1984 | Endo et al. | 152/209 R |
| 4,611,647 | 9/1986 | Rimondi | 152/209 B |
| 4,703,788 | 11/1987 | Kusube et al. | 152/209 R |

FOREIGN PATENT DOCUMENTS 3324706 1/1984 Fed. Rep. of Germany .
1330921 5/1963 France .
1195241 6/1970 United Kingdom ............ 152/209 B Primary Examiner—Michael W. Ball
Assistant Examiner—Mark A. Osele
Attorney, Agent, or Firm—David L. King; R. J. Slattery, III

[57] ABSTRACT

A pneumatic tire for agricultural use has a tread including an inner tread surface and a plurality of spaced tread lugs (170). The tread lug (170) for use with off-the-road or agricultural, has at least one sidewall in cross-section having two different angular inclinations. The sidewall has a first straight portion (202) which extends radially inwardly from an edge (204) of the ground engaging surface (200) of the lug (170) at a first angular inclination (b) with respect to the radial direction. A second straight portion (208) extends radially inwardly at a second angular inclination (c) with respect to the radial direction, while a first concaved curved portion (212) extends from the first straight portion (202) to the second straight portion (208). A second concaved curved portion (214) then extends radially inwardly from the second straight portion (208) to an inner tread surface (151).

5 Claims, 3 Drawing Sheets

AGRICULTURAL TIRE AND TREAD LUG THEREFOR

The present invention relates generally to pneumatic tires and more specifically to pneumatic tires designed to be used primarily off-the-road, and even more specifically as agricultural (farm) tires or tractor tires.

Pneumatic tires designed primarily for off-the-road use often feature an "open" tread pattern with a lower net-to-gross ratio than tires intended for highway use. Off-the-road tires also commonly feature axially extending tread lugs which cut into the loose ground surface. These tires are capable of being used on a variety of surfaces, such as mud, sand, compacted soil, gravel, etc. Typically the nonskid, the depth of the grooves in a tire tread measured from the top of the tread (lug, rib, etc.) to the bottom of the groove is much deeper than for passenger tires. The nonskid depth for a particular size and type of tire is generally determined by the U.S. Tire & Rim Association and set forth in the Engineering Design Information (EDI) handbook.

In some instances a particular soil condition may require the nonskid to be modified. For example in Western Europe the nonskid depth of their agricultural tires is typically deeper than that of the U. S. Specifically in these areas it is believed that a deeper nonskid is required to allow the tire to dig into and grip the soil.

Typically the deeper the nonskid is the larger the spacing between adjacent lugs, ribs, etc. is required to insure that the soil is "cleaned", removed, from the tire treads. In other words, if the grooves are narrow and deep the soil will compact therein during a rotation of the tire and not be removed during the next rotation causing less traction for subsequent tire rotations. This may result in the tractor becoming stuck in the field.

The spacing between adjacent lugs with deep nonskid must also be increased to provide for the bracing or support of the lug. This bracing is required to enable the lug to withstand the torsional and other forces acting there upon to tear it apart. If on the other hand, the spacing between lugs is increased too much to allow for better cleaning and/or bracing, harmonic vibrations may be established within the vehicle which cause undesirable ride characteristics. These vibrations may or may not be noticeable while off-the-road but may become very noticeable when the vehicle is driven on the road. Typically, with the advent of the large corporate or family farms coupled with the increasing size of the tractors, tractors are used more and more on the road to transport them to and from one field or another.

SUMMARY OF THE INVENTION

A pneumatic tire for agricultural use has a tread including an inner tread surface and a plurality of spaced tread lugs. The inner tread surface is spaced between the lugs. Each lug has at least one sidewall. A cross-section of the sidewall comprises a substantially straight portion extending radially inwardly from a cutting edge of a radially outermost surface of said lug at a first angular inclination, a second substantially straight portion extending radially inwardly at a second angular inclination, a first concave portion extending from the first straight portion to the second straight portion and a second concave curved portion extending radially inwardly from the second straight portion to the inner tread surface.

The first straight portion has a 0° to 5° angular inclination with respect to the radial direction. The second straight portion has a 12° to 25° angular inclination with respect to the radial direction.

Each of such lugs is spaced apart from another of such lugs by a distance of at least 12% of about 15% of the tread width. The tire has a net-to-gross ratio in the range of 25% to 40%.

Referring to FIG. 1, typically, the cross-section of a lug 20 is substantially that of a trapezoid. The smaller side 22 being that of the radially outermost portion of the lug, ie the ground penetrating surface. The radially inner portions 24 of the two sides 26 are generally provided with a radius R1 for blending them with the inner tread surface 28 or groove portion. Typically the side portions 26 extend from the radially outer most surface 22 at an angle "a" of from 12° to 18° with respect to the radial direction. If the angle "a" is maintained at about 15° for example, then the closer the lugs ZZ are spaced together about the tread and/or the deeper the nonskid or lug height LH is, the smaller the blending radius R1 must become. A smaller radius R1 produces more stress concentration in that particular region, which may induce cracking at the base of the lug which may further lead to the eventual removal of the lug itself from the tread.

It therefore is an object of this invention to provide a lug for use with agricultural or off-the-road tires.

It is further an object of this invention to provide a lug which is especially useful in deep nonskid applications.

It is further an object of this invention to provide a lug which allows for a closer spacing between lugs.

It is further an object of the invention to reduce the cracking at the base region of the lugs.

It is a feature of this invention to provide a lug which in cross-section has a sidewall with two different angular inclinations.

It is further a feature of this invention to provide lugs which have in cross-section two curved portions and two straight portions.

It is an advantage of this invention to provide lugs which are reduced in weight.

It is also an advantage of this invention to provide for lugs which can be spaced closer to one another while still providing good cleaning and a reduction in lug cracking.

These and other objects, features and advantages can be accomplished by a lug, for use with a pneumatic agricultural or off-the-road tire, comprising in cross-section: a first straight portion extending radially inwardly from an edge of a ground engaging surface of said lug at a first angular inclination, with respect to the radial direction; a second straight portion extending radially inwardly at a second angular inclination with respect to the radial direction: a first concaved curved portion extending from said first straight portion to said second straight portion: and a second concaved curved portion extending radially inwardly from said second straight portion to an inner tread surface.

BRIEF DESCRIPTION OF THE DRAWINGS

The following is a brief description of the drawings in which like parts may bear like reference numerals and in which.

The invention also may be better understood in the context of the following definitions, which are applicable to both the specification and to the appended claims:

"Axial" and "axially" are used herein to refer to lines or directions that are parallel to the axis or rotation of the tire.

"Leading" refers to a portion or part of the tread that contacts the ground first, with respect to a series of such parts or portions, during rotation of the tire in the preferred direction "Inner tread surface" means that part of the tread between the protruding tread lugs.

"Net-to-gross ratio" means the ratio of the area of the tire tread which normally makes contact with a paved road surface while in the footprint, divided by the area of the tread in the footprint, including non-contacting portions such as the inner tread surface.

"Outer tread surface" or "ground penetrating surface" means the radially outermost surface of the protruding tread lugs.

"Radial" and "radially" are used to means directions radially toward or away from the axis of rotation of the tire.

"Trailing" refers to a portion or part of the tread that contacts the ground last, with respect to a series of such parts or portions during rotation of the tire in the preferred direction.

DETAILED DESCRIPTION OF THE PREFERRED EMBODIMENT

Figure 2:
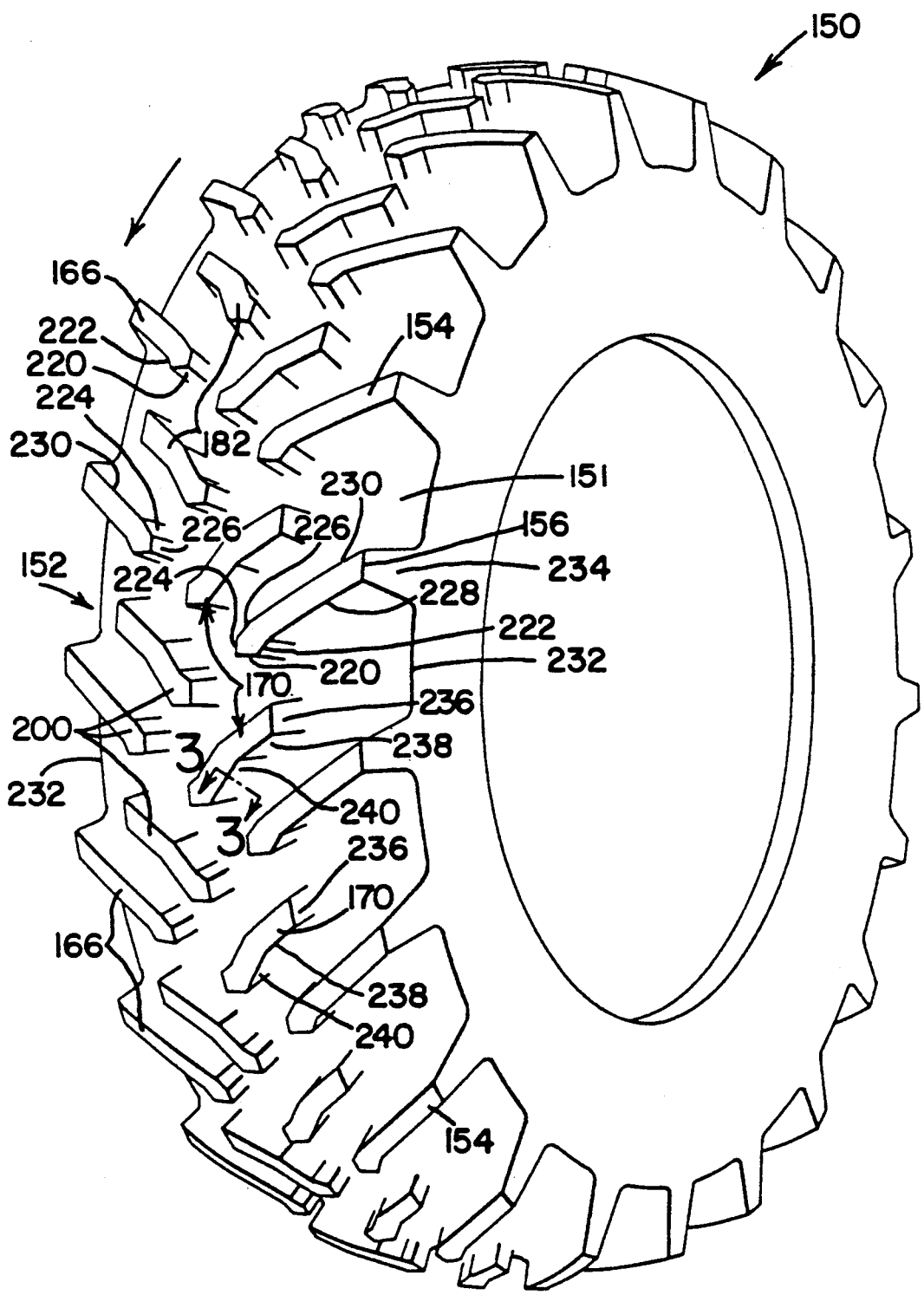
FIG. 2 is a perspective elevational view of a pneumatic tire incorporating the lugs according to one embodiment of the invention therein.

With particular reference now to FIG. 2, there is illustrated, for example, a pneumatic tire 150 designed primarily for off-road-use, of which may incorporate the lug embodied herein. The tire 150 of FIG. 2 is described in copending U.S. Application Ser. No. 07/419,912 filed concurrently herewith by M. L. Bonko, the disclosure of which is hereby incorporated by reference.

The tire 150 has a directional tread 152. From the inner tread surface 151 protrude axially extending primary lugs 154, 166 and secondary lugs 170, 182. The inner tread surface 151 between tread lugs and the tread edges has curvature in both the axial and circumferential directions. In a tire designed primarily for off-road use, as that shown in FIG. 2, the area of the inner tread surface between the protruding tread lugs usually contacts the ground surface. In normal operation, the primary lugs and secondary lugs cut into the loose ground surface and provide a means for axial traction and lateral stability while the inner tread surface provides flotation and supports the weight of the vehicle. In a tire designed for a more conventional highway application, the area of the inner tread surface between the protruding tread lugs does not contact the road surface. The net-to-gross ratio of off-the-road or agricultural tires can range for example from 25% to 40% as compared to about 60%-75% for on the road tires.

Often a tire designed primarily for off-road use must be driven on paved road surfaces. In such cases, only the radially outer tread surface 200 of the lugs contacts the road surface. Therefore, the lugs must have sufficient width and strength to support the vehicle.

The lugs of such off-the-road tires are subject to shearing and torsional forces in both off-the-road and on-the-road road conditions. As such, the lugs must be braced to withstand such forces.

Figure 1:
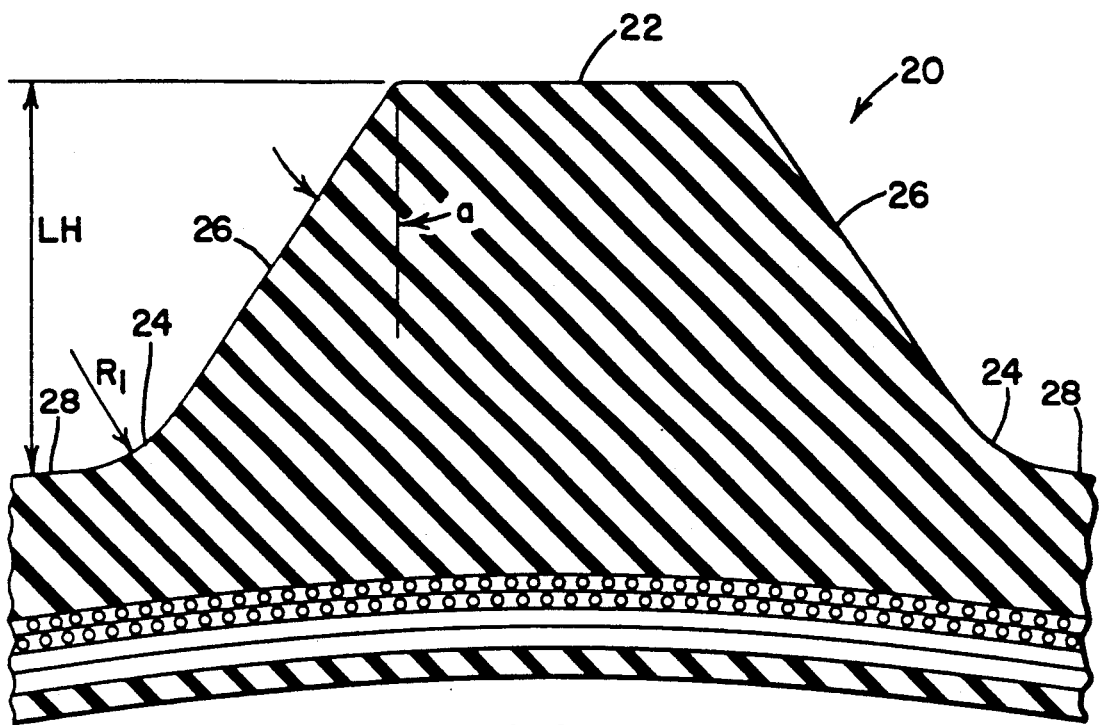
FIG. 1 is a cross-section of a lug according to the prior art.
Figure 3:
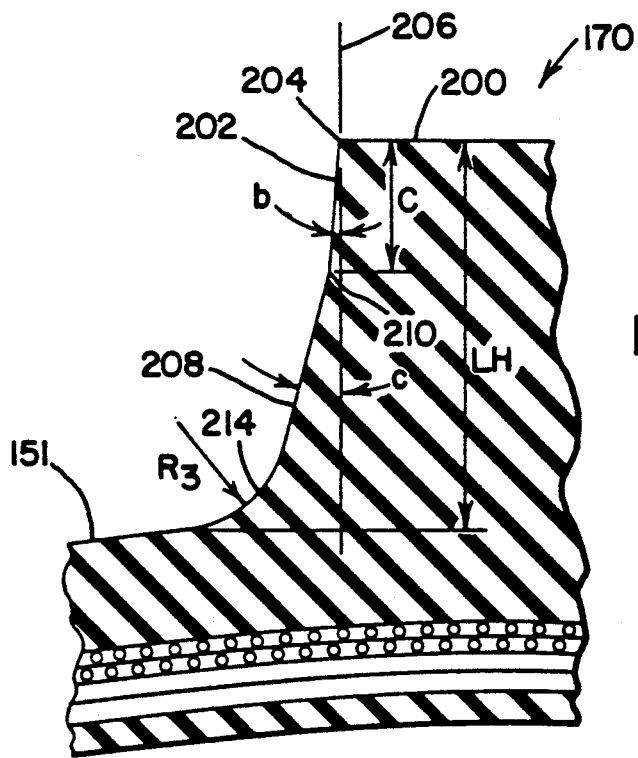
FIG. 3 is a fragmentary view of a cross-section of a lug according to one embodiment of the invention taken along line 3—3 of FIG. 2.

Referring also now to FIG. 3 the lugs 154, 166, 170, 182 may be braced such that in cross-section a sidewall of the lug has at least two different angular inclinations with respect to the radial direction. A first portion 202 extends radially inwardly from an edge 204 of the radially outermost tread surface 200 of the lugs at an angular inclination "b" with respect to the radial direction 206. The first portion is substantially straight, meaning that the first portion may deviate slightly from being straight and still be within this limitation. For example the intersection of the first portion 202 and the edge 204 of the radially outer surface 200 may be slightly rounded as opposed to a straight corner.

The angle of inclination "b" although it could be 0°, is preferred to be within the range of about 1° to about 5°. By providing a small inclination "b" the first portion comes away from the radially outermost portion sharply allowing for good penetration and cutting through the soil when used along the leading edge of the tire. This allows the tire to dig into and grip the soil. If the sidewall of a leading edge of a lug was made blunter by a larger angle or by excessive rounding at the edge 204 the result would be a decrease in such qualities.

A second portion 208 of the sidewall of the lug extends radially inwardly at an angular inclination "c" with respect to the radial direction 206. The second portion may extend from the first portion at a point 210 located a distance "C" from the radially outermost surface 200, wherein "C" is a percentage of the lug height "LH" of the lug. The lug height being the radial distance from the radially outermost surface 200 to the inner tread surface 151, otherwise known as the nonskid depth. Typically the distance "C" is from about 20% to about 30% of the tread lug height LH with a more preferred distance being about 25% of the tread lug height LH. Ideally the lug would have a sidewall that extended straight from the radial outer surface to the inner surface in the range of angle "b". This would result in a minimum amount of material to be used for the lug while providing good penetration. However, as stated above the lug needs to be braced to resist the forces acting upon it. Therefore by extending the first portion at a small angle "b" and then extending the second portion at a larger angle "c" the lug has a minimum amount of material for a distance "C" and then is more heavily braced over the remainder of the lug height. As such, the distance "C" cannot extend too far radially inwardly or the radially outer portion of the lug could be torn off. Therefore it is believed that "C" should be less than 30% of the lug height to prevent such occurrence.

Furthermore, the distance "C" of the inflection point 210 should be chosen such that the tire tread will have worn radially inwardly past that point before cracking could develop within that area. Typically stress is induced and/or concentrated in such inflection points. This could result in cracking and the eventual tearing of the lug as stated above. It is therefore preferred that "C" should be chosen such that the tire will wear past this inflection point before such problems can develop.

Figure 4:
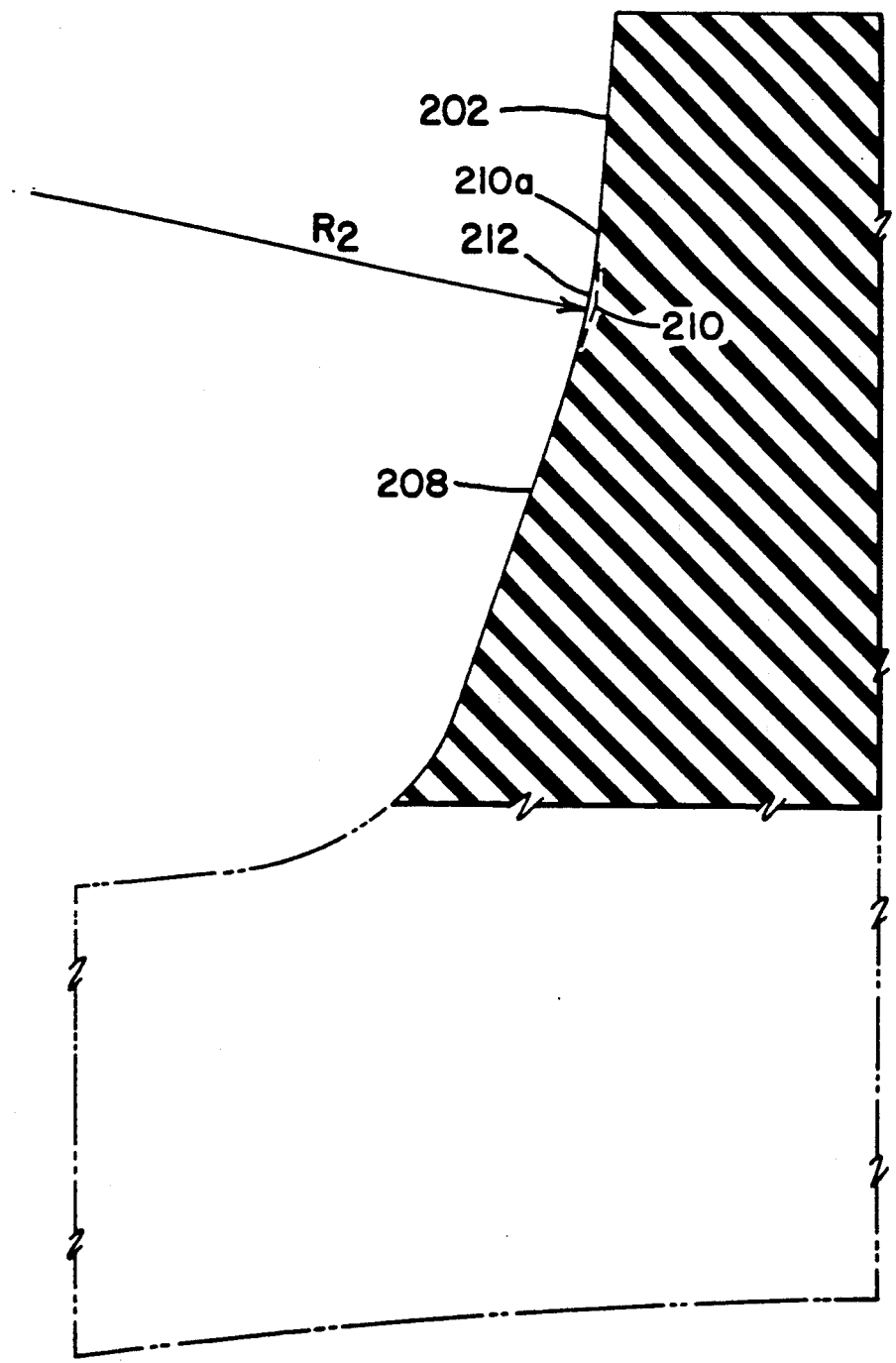
FIG. 4 is a fragmentary view of a cross-section of a lug according to another embodiment of the invention and taken about along lines 3—3 of FIG. 2.

Referring also to FIG. 4 to further help prevent such problems it is preferred to provide a curved portion 212 for providing a smoother transition from the first straight portion 202 to the second straight portion 208. The curved portion, which is concaved, may be provided by a blending radius $R_2$ which is tangent to both straight portions. This results in moving the point 210 axially outwardly 210a.

The angular inclination "c" of the second straight portion 208 is preferred to be at least 3 times greater than that of the angular inclination "b". More preferably the angular inclination "c" is within the range of about 12°-25° with a more preferred range being about 15° to 20°.

Another curved portion 214 extends radially inwardly from the second straight portion to the inner tread surface 151 for providing bracing there between. The curved portion 214 is also concaved and may be provided by a blending radius $R_3$ which is tangent to the second straight portion and the inner tread surface 151.

The above lug shape or profile can be used for any of the different sidewalls of the lugs of the tread. However it is not recommended to use such shape or profile on those sidewalls which are the leading edge of the lug and are adjacent to the lateral edge. This is for appearance reasons only, because those edges may project the appearance that they are under cut, when in fact they are not.

For example, the sidewalls of the leading edges 220, 222 and the trailing edges 224, 226, 230 of the primary lugs 154, 166 may incorporate the lug bracing or profile as described herein but it would not necessarily incorporate the leading edge 228, adjacent the lateral edge 232 of the tire. It is also preferred that the lateral edges 234 of the lugs are not provided with the profile described above.

In regard to secondary lugs 170, 182, those lugs that do not extend from a lateral edge 232 of the tread, it is preferred that the lateral edge 236 of the lug and the leading edge 238 adjacent to the lateral edge 236 of the lug be not provided with the dual angled bracing for the reasons set forth above. All other edges including the leading edge 240 could be so provided.

While certain representative embodiments and details have been shown for the purpose of illustrating the invention, it will be apparent to those skilled in this art that various changes and modifications may be made therein without departing from the scope of the invention.

What is claimed is:

1. A pneumatic tire for agricultural use having a tread including an inner tread surface and a plurality of spaced tread lugs, the inner tread surface being spaced between tread lugs, each of the lugs having at least one sidewall, and in cross-section comprising:
    a first substantially straight portion extending radially inwardly from a cutting edge of a radially outermost surface of said lug at a first angular inclination in the range of 0° to 5° with respect to the radial direction;
    a second substantially straight portion extending radially inwardly at a second angular inclination in the range of 12° to 25° with respect to the radial direction;
    a first concave curved portion extending from said first straight portion to the second straight portion;
    a second concave curved portion extending radially inwardly from the second straight portion to the inner tread surface; and
    wherein each of such lugs is spaced apart from another of such lugs by a distance of at least 12% to about 15% of the tread width and wherein the net-to-gross ratio of the tire is in the range of 25% to 40%.

2. The lug of claim 1 wherein the second angular inclination is in the range of about 15°-20°.

3. The lug of claim 1 wherein the second angular inclination is at least three times greater than the first angular inclination.

4. The lug of claim 1 wherein said lug has a lug height (LH), the lug height being the radial distance from a radially outermost surface of the lug to the inner tread surface, and said first concave portion is located radially inwardly of the radially outermost surface of the lug a distance from about 20% to about 30% of said lug height.

5. The lug of claim 4 wherein said first concave curved portion is located radially inwardly of the radially outermost surface of the lug a distance about 25% of the lug height.

* * * * *